United States Patent Office 3,207,804
Patented Sept. 21, 1965

3,207,804
NON-CONJUGATED POLYACETYLENE AND
METHOD OF PREPARATION
Bobby F. Adams, Painesville, and John H. Wotiz, Mentor, Ohio, assignors to Diamond Alkali Company, Cleveland, Ohio, a corporation of Delaware
No Drawing. Filed Aug. 6, 1959, Ser. No. 831,930
19 Claims. (Cl. 260—678)

This invention relates to novel polyynes comprising linear alpha, omega, polyacetylenic hydrocarbons and cyclic polyacetylenic hydrocarbons prepared by chemically reacting an organic dihalide with a compound containing the linkage —C≡C—, and to novel methods of preparing and using polyynes.

This is a continuation-in-part of our pending application Ser. No. 769,583, filed October 27, 1958, now U.S. Patent No. 3,052,734.

The present invention comprises the process illustrated by the following equation and certain novel products thereof:

$$M^1-C\equiv C-\left[(CH_2)_a(R^1)_b(CH_2)_c-C\equiv C-\right]_d M^2 + X(CH_2)_e(R^2)_f(CH_2)_gX \longrightarrow$$

(I)                                    (II)

$$M^3-C\equiv C\left\{\left[(CH_2)_a-(R^1)_b-(CH_2)_c-C\equiv C-\right]_d(CH_2)_e-(R^2)_f-(CH_2)_g-C\equiv C-\right\}_y M^4 + (R^1)_b \begin{Bmatrix} (CH_2)_a \\ (CH_2)_c-C\equiv C-\end{Bmatrix}_y \begin{Bmatrix} C\equiv C-(CH_2)_e \\ (R^2)_f \\ (CH_2)_g \end{Bmatrix}_d$$

(III)                                                        (IV)

wherein $M^1$, $M^2$, $M^3$ and $M^4$ are the same or different and are selected from the group consisting of copper, alkali metals, i.e., sodium, potassium, rubidium, lithium and cesium; alkaline earth metals, i.e., calcium, strontium and barium; and hydrogen; with the proviso that only one of $M^1$ and $M^2$ can be hydrogen; $a$ is a number from 0 to 20, inclusive; $b$ is a number from 0 to 2, inclusive; $c$ is a number from 0 to 20, inclusive; with the proviso that when $b$ is 0 or 1, either $a$ or $c$ is equal to or greater than 3 or the sum of $a$ and $c$ is equal to or greater than 3; $d$ is a number from 0 to 20, inclusive; $e$ is a number from 0 to 20, inclusive; $f$ is a number from 0 to 2, inclusive; with the proviso that when $f$ is 0, the sum of $e$ and $g$ is equal to or greater than 3; $g$ is a number from 0 to 20, inclusive; $y$ is a number from 1 to 10,000; X is chlorine, bromine, iodine or tosyl radical (CH₃—⟨benzene⟩—SO₂—O—)

$R_1$ and $R_2$ are the same or different radicals selected from the group consisting of alkylene, e.g., radicals having the structure —$C_mH_{2m}$— (and corresponding branched chain radicals), wherein $m$ is a number from 1 to 50; arylene, e.g., —⟨phenylene⟩—, —⟨phenylene(alkyl)₁₋₄⟩—, —⟨phenylene(alkyl₁ to 4)(halogen₄₋alkyl)⟩— as well as corresponding ortho and meta radicals, oxygen, sulfur, mercury, boron, boron-containing radicals such as —B(H)—, —B(alkyl)—, —B(alkyl₀ to 4)(halogen₀ to 4-alkyl)— heterocyclic radicals such as

⟨furan⟩, ⟨dioxane⟩, ⟨thiophene⟩, ⟨sulfone⟩, ⟨pyridine⟩ aryl substituted alkylene radicals, e.g.,

—C(H)(phenyl)—, —C(H)(phenyl)—C(H)(phenyl)—, —C(phenyl)— substituted alkylene radicals, e.g.,

—C(Cl)(Cl)—, —C(H)(O-alkyl)—, —O—(O-alkyl)(O-alkyl)—, —C(H)(S-alkyl)— tin, silicon,

—Si(H)(H)—, —Si(alkyl)(H)—, —Si(alkyl)(alkyl)— ; —O—M⁵—O— wherein $M^5$ is selected from the group consisting of calcium, barium, zinc, tin, lead, —Si(R⁴)(R⁴)—, —B(R⁴)—, —Al(R⁴)—

$R^4$ being selected from the group consisting of hydrogen, lower alkyl, i.e., up to about 10 carbon atoms, or aryl radicals, e.g., phenyl or naphthyl.

Referring to the preceding equation, the reactants I and II may be illustrated by the following:

(I)    $M^1-C\equiv C-\left[(CH_2)_a(R^1)_b(CH_2)_c-C\equiv C-\right]_d M^2$

Na—C≡C—Na
Mixture of 1-2Na—C≡C—Na and 1-2H—C≡C—Na
K—C≡C—K
Li—C≡C—Li
Cu—C≡C—CH₂CH₂CH₂CH₂—C≡C—Cu
Na—C≡C(CH₂)₅C≡C—H
Na—C≡C—(CH₂)₄—O—(CH₂)₄—C≡C—Na
Na—C≡C—(CH₂)₄—C≡C—(CH₂)₄—C≡C—Na
K—C≡C—CH₂CH₂CH₂—⟨phenylene⟩—CH₂CH₂CH₂CH₂—C≡C—K
Na—C≡C(CH₂)₄—C≡C—Hg—C≡C(CH₂)₄—C≡C—Na
Na—C≡C—CH₂CH₂—CH(phenyl)—CH₂CH₂—C≡C—Na $$Na-C\equiv C-CH_2CH_2-\underset{\underset{OCH_3}{|}}{\overset{\overset{OCH_3}{|}}{C}}-CH_2CH_2-C\equiv C-Na$$

$$Na-C\equiv C-CH_2CH_2-\underset{\underset{C_2H_5}{|}}{B}-CH_2CH_2-C\equiv C-Na$$

$$Na-C\equiv C-CH_2CH_2-\underset{O}{\overset{O}{\diamondsuit}}-CH_2CH_2-C\equiv C-Na$$

(II)  $X(CH_2)_e(R^2)_f(CH_2)_gX$ $Cl(CH_2)_4Cl$
$Cl(CH_2)_3Cl$
$Br(CH_2)_4Br$
$I(CH_2)_4-O-(CH_2)_4I$ $$CH_3-\langle\rangle-SO_2-O-(CH_2)_4-O-SO_2-\langle\rangle-CH_3$$

$I-(CH_2)_5-Br$ $$Br-CH_2CH_2CH_2-\underset{\underset{C_4H_9}{|}}{\overset{\overset{C_4H_9}{|}}{B}}-CH_2CH_2CH_2-Br$$

$$Br-CH_2CH_2CH_2-\underset{\underset{CH_3}{|}}{\overset{\overset{CH_3}{|}}{Si}}-CH_2CH_2CH_2CH_2-Br$$

$Cl(CH_2)_5Cl$

Novel linear compounds of this invention are hydrogen-ended compounds having the following structure:

$$M^3-C\equiv C-\left\{-\left[(CH_2)_a-(R^1)_b-(CH_2)_c-C\equiv C-\right]_d-(CH_2)_e-(R^2)_f-(CH_2)_g-C\equiv C-\right\}_y-M^4$$

wherein $M^3$, $M^4$, $a$, $b$, $c$, $d$, $e$, $f$, $g$, $y$ $R^1$ and $R^2$ are as defined hereinbefore.

A preferred linear polyyene of this invention has the structure:

$$H-C\equiv C-\left[-(Z)_h-C\equiv C-\right]_i-H$$

wherein Z is an alkylene radical, $h$ is a number from 3 to 10, inclusive, and $i$ is a number from 2 to 10, inclusive.

The term "alkylene radical" as employed in the specification and claims, unless otherwise defined, is intended to refer broadly to organic hydrocarbon radicals having the general formula $-C_mH_{2m}-$, $m$ being a number from 1 to about 50, inclusive, e.g., 1 to 20, which radicals may be either straight chain or branched chain, e.g., those having 2 to 15 carbon atoms. Specific examples of "alkylene radicals" are those containing 5 carbon atoms, e.g.:

$-CH_2-CH_2-CH_2-CH_2-CH_2-$ $-CH_2-CH_2-\underset{\underset{CH_3}{|}}{CH}-CH_2-$ $-CH-CH-CH-$
   |    |
   $CH_3$ $CH_3$ $-CH-CH-$
  |    |
  $CH_3$ $CH_2-CH_3$ $-CH_2-\underset{\underset{CH_2-CH_3}{|}}{CH}-CH_2-$ More particularly, preferred lower molecular weight hydrogen-ended alpha, omega polyacetylenic hydrocarbons, e.g., alpha, omega triacetylenic and alpha, omega tetraatylene hydrocarbones of this invention may be represented by the structure:

(V)    $HC\equiv C-R_1-\left[-C\equiv C-R_2-\right]_n-C\equiv CH$ wherein $n$ is a number equal to or greater than 1, e.g., a number from 1 to about 15, inclusive, $R_1$ and $R_2$ are alkylene radicals containing from 2 to about 15 carbon atoms, e.g., polymethylene and branched chain polymethylene radicals, such as ethylene, trimethylene, tetramethylene, pentamethylene, heptamethylene, propylene, butylene, and the like.

Novel alpha, omega triacetylenic hydrocarbons of this invention may be represented by the structure:

(VI)    $HC\equiv C-R_7-C\equiv C-R_8-C\equiv CH$ wherein $R_7$ and $R_8$ are alkylene radicals containing 2 to about 50 carbon atoms, inclusive. Specific illustrative triacetylenic hydrocarbons of this invention are:

1,9,17-octadecatriyne
1,8,15-hexadecatriyne
1,7,13-tetradecatriyne
1,6,11-dodecatriyne Further illustrative linear compounds of this invention are alpha, omega tetraacetylenic hydrocarbons which may be represented by the structure:

(VII)    $HC\equiv C-R_9-C\equiv C-R_{10}-C\equiv C-R_{11}-C\equiv CH$ wherein $R_9$, $R_{10}$, and $R_{11}$ are alkylene radicals containing from 2 to about 50 carbon atoms, inclusive. Specific illustrative tetraacetylenic hydrocarbons within structure VII are:

1,7,13,19-eicosatetrayne
1,8,15,22-tricosatetrayne
1,9,17,25-hexacosatetrayne
1,10,19,28-nonacosatetrayne Novel cyclic compounds of this invention have the following structure:

$$\left[\begin{array}{c}(CH_2)_a\\(R^1)_b\\(CH_2)_c-C\equiv C\end{array}\right]-\left\{\begin{array}{c}C\equiv C-(CH_2)_e\\(R^2)_f\\(CH_2)_g\end{array}\right\}_y$$

wherein $a$, $b$, $c$, $d$, $e$, $f$, $g$, $y$, $R^1$ and $R^2$ are as defined hereinbefore, except that $R^1$ and $R^2$, when they comprise alkylene radicals of the general formula $-C_mH_{2m}-$, $m$ is equal to or greater than five when $d$ is one and $y$ is one.

More specifically, novel cyclic acetylenically unsaturated hydrocarbons of this invention may be represented by the structure:

(VIII)

$$\left[\begin{array}{c}-R_3-C\equiv C-\\\left[-C\equiv C-R_4-\right]_n\end{array}\right]_x$$

wherein $n$ is a number equal to or greater than 1, e.g., a number from 1 to about 15, $R_3$ and $R_4$ are alkylene radicals containing at least 5 carbon atoms, and $x$ is a number from 1 to 20, inclusive.

Still more specifically, preferred novel cyclic acetylenic hydrocarbons within the scope of this invention may be represented by the sturcture:

(IX)

$$\left[R_{12}\diagdown\begin{array}{c}C\equiv C\\C\equiv C\end{array}\diagup R_{13}\right]_x$$

wherein $R_{12}$ and $R_{13}$ are alkylene radicals having at least 5 carbon atoms, e.g., 5 to 50 carbon atoms. Specific illustrative cyclic acetylenic hydrocarbons within the scope of the structure IX are:

1,7-cyclotridecadiyne
1,8-cyclotetradecadiyne
1,9-cyclopentadecadiyne
1,10-cyclohexadecadiyne 1,7,13-cyclooctadecatriyne
1,8,15-cycloheneicosatriyne
1,9,17-cyclotetracosatriyne Thus, such compounds can be prepared via the reaction:

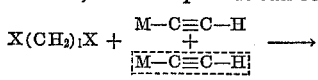

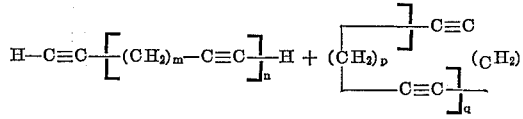

wherein M is as previously defined and preferably an alkali metal, e.g., Na, X is chlorine, bromine or iodine, 1 is a number from 3 to 40, $m$ is a number from 3 to 40, $n$ is a number from 1 to 10,000, $p$ is a number from 5 to 40, and $q$ is a number from 5 to 20; when a large value of $n$ is desired, no M—C≡C—H is employed.

Polyynes of this invention can also be prepared using a polyacetylide as a reactant (I), e.g.,

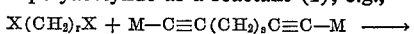

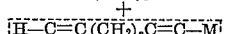

wherein M is a metal, e.g., Na, $r$ is a number from 1 to 40 $s$ is a number from 1 to 40 and $n$ is an odd number greater than one; $p$ and $q$ being as already defined.

As indicated previously hereinbefore, compounds III and IV of this invention can be produced by reacting a compound producing the linkage —C≡C— and a dihalo alkylene; more broadly stated, such compounds can be produced by reacting compounds I and II.

The expression "compound producing the linkage —C≡C—" is intended to refer to compounds which produce the linkage —C≡C— in the reaction system. Although the preferred compounds of this type are dialkali metal acetylides, such as disodium, dilithium and/or dipotassium acetylides, the expression is not to be so limited since it is intended to refer broadly to mono and polyacetylide compounds providing the desired —C≡C— linkage, e.g., alkaline earth acetylides such as calcium, barium, strontium, beryllium and magnesium acetylides. For convenience in describing the invention, particular reference will be made hereinafter to alkali metal acetylides as illustrative of such reactants and as constituting a presently preferred type of reactant.

The following two equations more specifically illustrate the reactions involved:

METHOD A

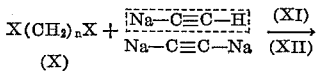

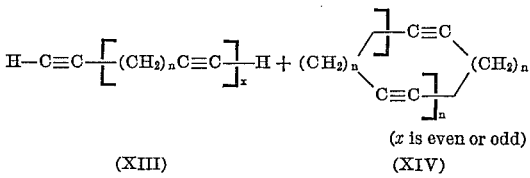

METHOD B

X(CH₂)ₙX + Na—C≡C(CH₂)ₙC≡C—H and/or Na —→

XIII + XIV, when X=odd number (even number of triple bonds)

METHOD C

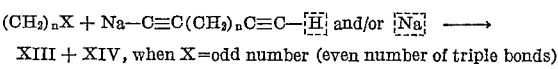

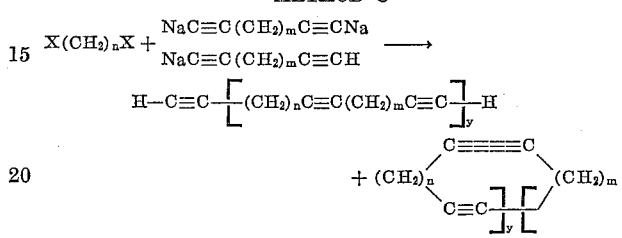

Compound XI is employed to a reactant when it is desired to minimize the formation of high molecular weight products; when it is omitted, a polymeric product XIII and XIV are formed. Appropriate mixtures of XI and XII can be prepared by metering a known volume of acetylene into a suspension of NaNH₂ (from weighed amount of Na) in liquid NH₃, e.g., 3H—C≡C—H+5NaNH₂→
Na—C≡C—Na+1Na—C≡CH An equivalent excess of I, XI and XII over the reactants II and X is desirable to minimize the amount of halogen-terminated polyynes formed, e.g., (XV) 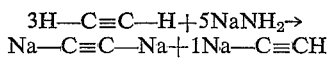

The thus-obtained alkali metal ended products are converted to hydrogen-terminated products during the typical work-up of the reaction, e.g., addition (as by washing) of water causes hydrolysis.

Referring to Methods A and B, a high concentration of Na—C≡C—Na (absence of Na—C≡C—H) favors the formation of cyclic product, whereas a high concentration of Na—C≡C—H (absence of Na—C≡C—Na) favors linear product. If only Na—C≡C—H is present, the product is H—C≡C(CH₂)ₙC≡C—H. No linear polyyne should be formed. However, secondary reactions such as

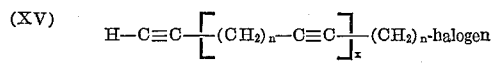

may be responsible for the presence of linear polyynes in cases which do not contain any Na—C≡C—Na.

Some representative products of this invention are set forth in the following table:

| Polyyne Type | n | x | M.P., °C. | B.P., °C. | mm. | Method |
|---|---|---|---|---|---|---|
| V | 4 | 2 | | 111 | 1.0 | A |
| V | 4 | 8 | 55 | | | A |
| V | 5 | 3 | 33 | | | B |
| V | 6 | 2 | 24 | 131 | 0.2 | A |
| H—C≡C(CH₂)₄—O—(CH₂)₄C≡CH | | | | 130 | 30.0 | A |
| VIII | 5 | 1 | 100 | | | A |
| VIII | 4 | 3 | 71 | 215 | 0.2 | B |
| (CH₂)₄—C≡C(CH₂)₄—O / O(CH₂)₄—C≡C—(CH₂)₄ | | | 75 | | | A |
|  | | | 7 | 83 | 0.08 | C |

Furthermore, if one reacts $X(CH_2)_nX$ with given ratio of mono to disodium acetylide (say 1:1), the yield of cyclic product increases with an increase in dilution. For example, the same quantity of reactants in one liter of solvent, e.g., $NH_3$ will yield cyclic product than the corresponding reaction in 5 liters of solvent. Higher dilution separates the molecules giving less chance for intermolecular interaction (linear product). If a molecule has a functional group capable of interaction, e.g., $$Na-C{\equiv}C-(CH_2)_nC{\equiv}C(CH_2)_nX$$

then intramolecular reaction (formation of cyclic product) is favored by higher dilution. However, if the two reactive ends cannot get together (because of size or shape of the molecule), no cyclic product will be formed no matter what dilution is employed. Thus, the amount of cyclic product will also depend on the value of $n$ in $X(CH_2)_nX$. Specifically, we find that intramolecular reaction is the favored reaction when $n=5$. The product 1,8-cyclotetradecadiyne, is formed in relatively high yield even over a wide range of mono to disodium acetylide ratios. Conversely, a linear product is favored in concentrated solutions, absence (or low concentration) of chain stoppers (e.g. $Na-C{\equiv}C-H$) and with molecules where reactive ends are not likely to self-condense.

The dialkali metal acetylide may be prepared by any convenient method; for example, the following empirical equations illustrate several other methods for the preparation of this compound, any one of these preparations being satisfactory.

$$2Na + HC{\equiv}CH \rightarrow NaC{\equiv}CNa$$
$$2NaNH_2 + HC{\equiv}CH \rightarrow NaC{\equiv}CNa$$
$$NaC{\equiv}CH + NaNH_2 \rightarrow NaC{\equiv}CNa$$

A discussion of the preparation of disodium acetylide, sodium amide, and of the above reactions may be found in Inorganic Synthesis, vol. 2, Editor-in-Chief W. Conrad Fernelius, the McGraw-Hill Book Company, Inc., New York (1946), pages 75 and following.

The polyynes of this invention may be prepared by chemically reacting separately prepared dialkali metal acetylide and an alkylene dihalide or they may be prepared in situ with the initial preparation of the disodium acetylide, i.e., sodium and acetylene may be reacted in the presence of ammonia followed by the addition of the alkylene dihalide, preferably in the same reaction zone.

A desired ratio mono to disodium acetylide can be established by adjusting the amount of acetylene that is introduced into a reaction vessel containing a given amount of $NaNH_2$, e.g., $$\underset{(3:2)}{3NaNH_2 + 2HC{\equiv}CH} \longrightarrow \underset{(1:1)}{NaC{\equiv}CH + NaC{\equiv}CNa}$$
$$\underset{(4:3)}{4NaNH_2 + 3HC{\equiv}CH} \longrightarrow \underset{(2:1)}{2NaC{\equiv}CH + NaC{\equiv}CNa}$$
$$\underset{(5:3)}{5NaNH_2 + 3HC{\equiv}CH} \longrightarrow \underset{(1:2)}{NaC{\equiv}CH + 2NaC{\equiv}CNa}$$

Since $NaNH_2$ is prepared in quantitative yield by the reaction of sodium with ammonia, the weight of used sodium determines the amount of $NaNH_2$ present. Acetylene is measured with wet test gas meter, 1 mole (S.T.P.)=22.4 liters.

As stated, the disodium acetylide may be prepared in a reaction zone separate from the reaction zone in which the disodium acetylide is reacted with the alkylene dihalide. Exemplary of this is the preparation of compounds wherein 2 moles of the disodium acetylide previously prepared in a separate reaction zone are reacted with 1 to 3 moles of the alkylene dihalide. These reactants are combined in essentially stoichiometric ratios; however, considerable departure from these ratios may be tolerated, such as up to about 10%–15% departure from these ratios, without serious detriment to either quality of product or yield; an equivalent excess of the disodium acetylide being preferred when a hydrogen-ended product is desired.

This reaction is typically and advantageously carried out in a polar solvent such as anhydrous liquid ammonia; other solvents which may be employed are butylamine, ethylenediamine, triethylamine, tetrahydrofuran, dimethylether of diethylene glycol, dimethylether, dimethylformamide, dimethylacetamide, methyl pyrolidone, ethyl acetal, and dioxane or mixtures of the foregoing, e.g., a mixture of dimethylformamide and tetrahydrofuran. Such solvents also may be diluted with neutral solvents such as ethyl ether or other aliphatic or aromatic solvents.

The reaction temperature generally is dictated by the solvent employed, e.g., reaction is typically carried out at the reflux temperature of the solvent or solvent mixture; a temperature of $-30°$ to $-35°$ C. is typical when employing liquid ammonia. However, temperatures of $-100°$ to $200°$ C. may be used. If necessary, superatmospheric pressures of up to about 40 atmospheres are generally satisfactory; if desired, higher pressures also can be used. The reaction occurs in a period of about 1 to 48 hours, typically 1 to 24 hours, the exact reaction time depending on a number of factors, e.g., solvent, reactivity of halide (I>Br>Cl) and especially temperature.

The desired polyacetylenic hydrocarbons can be isolated upon reaction completion by adding water or other proton donor solvents, e.g., alcohols such as methanol, ethanol, propanol, butanol and isopropanol and acids such as Lewis acids, i.e., those discussed specifically in Noller's Chemistry of Organic Compounds, pages 233 through 235, to the reaction mixture followed by centrifuging or filtering, crystallizing, and/or distilling, preferably at reduced pressure, as described more fully hereinafter.

Polyacetylenic hydrocarbons of this invention also may be prepared in the same reaction zone as that employed in the preparation of disodium acetylide. That is, the following illustrative reactions may be carried out in the same reactor:

$$2Na + 2NH_3 \xrightarrow{Cat.} 2NaNH_2 + H_2$$
$$2NaNH_2 + HC{\equiv}CH \longrightarrow NaC{\equiv}CNa + 2NH_3$$
$$NaC{\equiv}CNa + XRX \longrightarrow \text{Compounds III and IV}$$

wherein XRX is compound II, defined previously. Although liquid ammonia is the preferred solvent for these reactants, other organic solvents, such as amines, e.g., butylamine, ethylenediamine, triethylamine and diethylamine, tetrahydrofuran, and ethers such as dimethylether, diethylether, dimethylether of diethylene glycol and dimethylformamide dioxane, mixtures of the foregoing, or any of the polar solvents previously referred to herein, e.g., a mixture of dimethylformamide and tetrahydrofuran may be employed. The reactants are mixed in the order indicated in the above equations at a temperature dictated by the solvent employed, but typically at a temperature of about $-100°$ C. to $200°$ C., e.g., $-35°$ C. to $+25°$ C. Normally, an equivalent excess of the acetylide reactant is employed; also, an excess of $NH_3$ when employed as solvent may be desirable. The reaction is typically carried to completion over a period of about 3 to 36 hours. Isolation of the product may be carried out by means common in the art, such as recrystallization from an organic solvent, e.g., petroleum ether, methanol, diethyl ether, benzene, ethanol, propanol and the like; the desired product may also be isolated through distillation typically at reduced pressure or through either liquid or vapor phase chromatography.

Specific illustrative preparations involving the reaction of disodium acetylide and an alkylene dihalide are the preparation of compounds of structures VI and VII above. Although the preferred preparation of these compounds VI and VII comprises chemically reacting disodium acetylide and an alkylene dihalide, the disodium acetylide being prepared in the same reaction zone, these reactants may be prepared and combined in separate reaction zones, i.e., the disodium acetylide may be prepared in a reaction zone separate from that employed in the reaction of disodium acetylide and the alkylene dihalide. Typical reaction conditions in the prepaartion of alpha, omega tri- and tetraacetylenic hydrocarbons are as follows: 2000 to 5000 parts by weight of liquid ammonia is mixed with 1 to 10 parts by weight of a catalyst, e.g., ferric nitrate, iron oxide, or sodium peroxide; followed by the addition of 50 to 100 parts by weight of sodium metal to form sodium amide; 50 to 100 parts by weight of acetylene gas is then added to this mixture. 2 to 4 moles of an alkylene dihalide is added at a rate sufficient to maintain a gentle refluxing of the ammonia. Upon reaction completion, 100 to 2000 parts by weight of water are added slowly to the reactant mixture with agitation.

The desired product is isolated by recrystallization from an organic solvent, such as petroleum ether, methanol, ethanol, propanol, diethyl ether or benzene, the resultant product being further distilled at reduced pressure yielding the desired tri- and tetraacetylenically unsaturated compounds.

Illustrative of the foregoing and other specific compounds of this invention are the following compounds having the indicated structures:

1,9,17-octadecatriyne (H—C≡C—(CH$_2$)$_6$—C≡C—(CH$_2$)$_6$—C≡C—H)

1,8,15-hexadecatriyne (H—C≡C—(CH$_2$)$_5$—C≡C—(CH$_2$)$_5$—C≡C—H)

1,7,13-tetradecatriyne (H—C≡C—(CH$_2$)$_4$—C≡C—(CH$_2$)$_4$—C≡C—H)

1,6,11-dodecatriyne (H—C≡C—(CH$_2$)$_3$—C≡C—(CH$_2$)$_3$—C≡C—H)

1,6,11,16-heptadecatetrayne (H—C≡C—(CH$_2$)$_3$—C≡C—(CH$_2$)$_3$—
    C≡C—(CH$_2$)$_3$—C≡C—H)

1,7,13,19-eicosatetrayne (H—C≡C—(CH$_2$)$_4$—C≡C—(CH$_2$)$_4$—C≡C—
    (CH$_2$)$_4$—C≡C—H)

1,8,15,22-tricosatetrayne (H—C≡C—(CH$_2$)$_5$—C≡C—(CH$_2$)$_5$—C≡C—
    (CH$_2$)$_5$—C≡C—H)

1,9,17,25-hexacosatetrayne (H—C≡C—(CH$_2$)$_6$—C≡C—(CH$_2$)$_6$—
    C≡C—(CH$_2$)$_6$—C≡C—H)

1,10,19,28-nonacosatetrayne (H—C≡C—(CH$_2$)$_7$—C≡C—(CH$_2$)$_7$—
    C≡C—(CH$_2$)$_7$—C≡C—H)

1,7,13,19,25-hexacosapentayne (H—C≡C—(CH$_2$)$_4$—C≡C—(CH$_2$)$_4$—
    C≡C—(CH$_2$)$_4$—C≡C—(CH$_2$)$_4$—C≡C—H)

1,7-cyclotridecadiyne

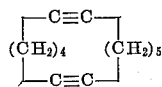

1,8-cyclotetradecadiyne

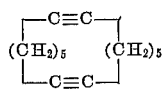

1,8-cyclopentadecadiyne

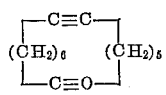

1,9-cyclohexadecadiyne

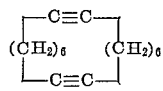

1,7,13-cyclooctadecatriyne

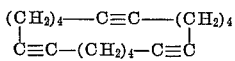

1,8,15-cycloheneicosatriyne

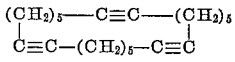

1,9,17-cyclotetracosatriyne

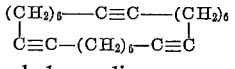

1,12-dioxa-6,17-cyclodocosadiyne

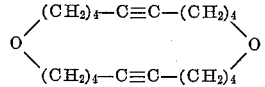

1,7,13,19-cyclotetracosatetrayne

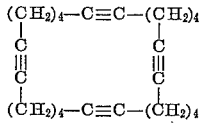

1,8-cyclohexadecadiyne

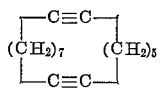

Compounds within the scope of structures VIII and IX may be prepared by chemically reacting a dialkali metal acetylide and an alkylene dihalide under essentially the same reaction conditions employed for the preparation of a linear alpha, omega polyacetylenic hydrocarbon; that is, the cyclic hydrocarbon may be and is normally prepared as a by-product in the preparation of the linear hydrocarbons. The formation of this cyclic hydrocarbon is enhanced by increased dilution of the initial starting materials, typical proportions being about 4000 to 8000 parts by weight of solvent, 70 to 150 parts by weight disodium acetylide, and 1 to 2 moles of alkylene dihalide.

The specifically preferred preparation at present is the reaction of disodium acetylide, prepared either in the same reaction zone or in a different reaction zone, with a polymethylene dibromide, this reaction taking place in the presence of a solvent, typically liquid ammonia, under the same reaction conditions given previously.

Fractional vacuum distillation is used if the boiling points are below the decomposition temperatures. Pot temperatures up to 350° C. are used. Fractional crystallization from conventional solvents, e.g., petroleum ether, can be used in cases where the products have "close" boiling points, e.g.,

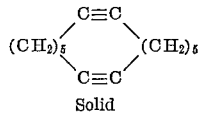
Solid

HC≡C(CH$_2$)$_5$C≡C(CH$_2$)$_5$C≡CH
Liquid

Trituration with liquids of limited solvent power (e.g. cold low molecular weight petroleum ether) also separates products according to molecular weights.

Linear products can be separated from cyclic also by conversion to insoluble mercury derivatives which can be removed by filtration.

The linear polyynes may be regenerated on acidification with dilute HCl.

The novel polyacetylenic hydrocarbons of this invention comprise products which are useful as chemical intermediates as in the preparation of ethylenically bonded compounds and exhibit biological activity in addition to applications in the field of chlorinated aromatic hydrocarbon stabilization. More specifically, compounds of this invention exhibit activity as insecticides, fungicides, herbicides and nematocides.

While compounds of this invention may be employed in a variety of applications, biologically active or otherwise, when employed as biologically active materials it will be understood, of course, that such compounds may be utilized in diverse formulations both liquid and solid including finely-divided powders and granular materials as well as liquids such as solution, concentrates, emulsifiable concentrates, slurries and the like, depending upon the application intended and the formulation media desired.

These compounds may be used alone or in combination with other known biologically active materials such as other acetylenically unsaturated compounds, organic phosphate pesticides, chlorinated hydrocarbon insecticides, foliage and soil fungicides, and the like.

Thus, it will be appreciated that compounds of this invention may be employed to form biologically active substances containing such compounds as essential active ingredients which compositions may also include finely-divided dry or liquid carriers, extenders, fillers, conditioners, including various clays, such as talc, spent catalyst, alumina silica materials, liquids, solvents, diluents or the like, including water and various organic liquids such as benzene, toluene, chlorinated benzene, acetone, cyclohexanone, chlorinated xylene, carbon tetrachloride, ethylene dichloride, tetrachloroethylene, carbon disulfide, and alcohols at various temperatures thereof.

When liquid formulations are employed or dry materials prepared which are to be used in liquid form, it is desirable in certain instances additionally to employ a wetting, emulsifying or dispersing agent to facilitate use of the formulation, e.g., Triton X–155 (alkyl aryl polyether alcohol, U.S. Patent 2,504,064). Other suitable surface active agents may be found in an article by John W. McCutcheon in Soap and Chemical Specialties, vol. 4, Nos. 7–10 (1955).

The term "carrier" as employed in the specification and claims is intended to refer broadly to materials constituting a major proportion of a biologically active or other formulation and hence, includes finely-divided materials both liquids and solids, as aforementioned conveniently used in such applications.

Moreover, the present invention relates to pesticidal compositions containing the acetylenic hydrocarbons of this invention, e.g., 1,7,13,19,25-hexacosapentayne as a contact poison for bean beetles, and to methods of killing pests employing these compositions.

Still further, the compounds of this invention are useful in the inhibition of decomposition of a halogenated aromatic hydrocarbon. In this application it has been found that decomposition of a halogenated hydrocarbon, e.g., a chlorinated xylene, may be prevented by the addition thereto of a stabilizing amount of a compound according to the structure:

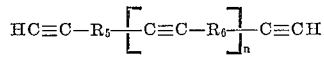

wherein $n$ is a number equal to or greater than 1, e.g., a number from 1 to about 15, inclusive, $R_5$ and $R_6$ are alkylene radicals having greater than 4 carbon atoms, e.g., 1,8,15-hexadecatriyne. It has also been found that compounds within the scope of structure VIII are particularly useful in the stabilization of benzyl chloride, the preferred compound in this application being 1,8-cyclotetradecadiyne.

It is known that a chlorinated xylene in a pure condition may be stored or shipped with little or no decomposition induced by exposure to air, light, heat and/or moisture. However, in many instances obtaining such high purity chlorinated xylene in commercial production is not feasible. It has been found that the chlorinated xylenes normally encountered in commerce are subject to some degree of decomposition when in contact with substances such as specks of rust or aluminum, dirt, air, light, heat, moisture and the like. Hence, means for preventing and/or inhibiting this decomposition of chlorinated xylenes and/or other chlorinated aromatic hydrocarbons generally associated therewith are highly desirable.

Previously various stabilizers for aliphatic chlorinated hydrocarbons have been employed. Some of these compounds which have demonstrated a degree of effectiveness are acetylenic alcohols, acetylenic ethers, straight chain acetylenic esters, monoacetylenic hydrocarbons and monoacetylenic monoolefinic hydrocarbons. Although these prior stabilizers enjoyed a certain amount of success, surprisingly, such materials are not satisfactory for the stabilization of chlorinated xylenes and specifically alpha-chloro-p-xylenes for various reasons. Acetylenic alcohols are highly effective for the stabilization of such chlorinated aliphatic hydrocarbons as perchlorethylene but are ineffective for the stabilization of chlorinated xylenes such as alpha-chloro-p-xylenes in that significant decomposition occurs even though the alpha-chloro-p-xylene contains relatively large quantities of these compounds. Monoacetylenic monoolefinic hydrocarbons and straight chain acetylenic esters are unsatisfactory for the same reason.

In view of the fact that the above acetylenically unsaturated general stabilizers employed are unsatisfactory, it would lead to the conclusion that the compositions employed in the stabilization of chlorinated xylenes and the method of stabilizing such compounds are highly selective and, therefore, those stabilizers employed previously in the stabilization of chlorinated aliphatic hydrocarbons, such as carbon tetrachloride, perchlorethylene, tetrachlorethylene and the like, are not adaptable to the stabilization of chlorinated xylenes. This is emphasized by the fact that although 1,8-cyclotetradecadiyne is useful as a stabilizer for benzyl chloride, it is not applicable to the stabilization of alpha-chloro-p-xylene.

Unstabilized quantities of halogenated aromatic hydrocarbons as produced, including such compounds as alpha-chloro-p-xylene and benzyl chloride, may be either in a relatively pure or impure condition. For the most part the purity of such a halogenated aromatic hydrocarbon depends upon its age, i.e., the length of time it has stood unstabilized after production without particular efforts being made to prevent the decomposition. Accordingly, a relatively impure halo aromatic hydrocarbon is found to be of limited utility for many industrial needs although further decomposition may be inhibited by using the stabilizers for the present invention. On the other hand, some unstabilized halo aromatic hydrocarbons are employed while relatively fresh and are correspondingly pure and usable. Such materials require only stabilization against further decomposition in order to be satisfactory for a number of uses.

Where the initial purity is not tolerable the chlorinated aromatic hydrocarbon may require pretreatment of a nature such that the major proportion or substantially all of the impurities are removed prior to the addition of stabilizers so as to provide a material having a good initial level of acceptability for industrial needs. As noted above, some chlorinated aromatic hydrocarbons may not require such pretreatment although those skilled in the art will understand that a chlorinated xylene containing undesirable impurities may advantageously be treated for the removal or reduction of any impurities prior to stabilization. Such purification may be effected through means common in the art, such as distillation.

In general, the present invention is directed to a composition comprising essentially a chlorinated aromatic hydrocarbon, e.g., a normally liquid chlorinated xylene, such as alpha-chloro-p-xylene and a stabilizing amount of at least one polyacetylenic hydrocarbon, i.e., triacetylenic hydrocarbon and tetraacetylenic hydrocarbon, preferably 1,8,15-hexadecatriyne.

Further, the present invention is directed to a composition comprising essentially benzyl chloride and a stabilizing amount of at least one cyclic acetylenic hydrocarbon, e.g., 1,8-cyclotetradecadiyne.

Further, the invention is directed to such a composition including an additional ingredient effective to exert a stabilizing action against the influence of light and other sources of decomposition. This is intended to include other stabilizers which may be combined with the stabilizers of the present invention which cause a synergistic effect concerning the stabilization of halogenated aromatic hydrocarbons. Typical stabilizer combinations of 1,8,15-hexadecatriyne and bis-(2-propynyl)-2,3,5,6-tetrachloroterephthalate, 1,8,15-hexadecatriyne and sorbitol, and 1,8-cyclotetradecadiyne and ethylene glycol. It will be understood that the invention is not limited to a particular light, heat, or other stabilizers, and that, in general, any well-known light or other stabilizer may be employed with the general purpose stabilizers of this invention.

As stated, a new class of stabilizers noted above, namely, alpha, omega, tri- and tetraacetylenic hydrocarbons have been found particularly effective in stabilizing alpha-chloro-p-xylene contaminated with minor amounts of metallic ions, such as those produced by specks of rust or aluminum, both in a liquid or in a vapor phase. For the most part, the stabilizing effect has been found to be most pronounced and prolonged where pre-treatment which removes the greater part of contaminating metallic ions has been resorted to prior to the addition of the stabilizing alpha, omega, tri- or tetraacetylenic hydrocarbon.

The method of stabilizing halogenated aromatic hydrocarbons, i.e., chlorinated aromatic hydrocarbons, in accordance with this invention comprises essentially contacting a major proportion of the halogenated aromatic hydrocarbons, i.e., the chlorinated xylenes or benzyl chloride, with a stabilizing amount of the alpha, omega, polyacetylenic hydrocarbon or the polycycloacetylenic hydrocarbon, respectively. It is preferred that the stabilizer be added after the initial preparation of the halogenated hydrocarbon, i.e., after the chlorination step, and that the stabilizing amount of the respective stabilizers be combined, as noted above, e.g., in an amount of about 0.0001% to 5% by weight of the halogenated aromatic hydrocarbon, preferably, however, from about 0.1% to 1% by weight of the chlorinated aromatic hydrocarbon. Under more adverse conditions, such as higher temperatures and/or excessive contamination, it may be necessary to add several percent of the stabilizer. Large quantities of the stabilizer are seldom necessary or desirable and in most cases amounts of stabilizer less than 5% by weight of the halogenated aromatic hydrocarbon protect the halogenated compound against the decomposition under the most severe conditions normally encountered. The indicated intermediate preferred range is generally sufficiently effective for the purified halogenated aromatic hydrocarbon containing not more than 0.2% by weight of the metallic impurities most common in commercial production.

Other applications of compounds of this invention include polymers, solid rocket fuel binders, coatings, films, fibers, intermediates, polymerization catalysts, high energy fuels, rocket fuel starters, plasticizers, stabilizers, and the like.

Other applications and uses will be apparent to those skilled in the art in view of the following specific examples. These examples are offered in order that those skilled in the art may more completely understand the present invention and the preferred methods by which the same may be carried into effect.

Example 1

PREPARATION OF 1,8-CYCLOTETRADECADIYNE 2.5 liters of liquid ammonia is placed in a flask, followed by the addition of 1.35 g. of ferric nitrate hydrate (0.3 g. for each g. atom of sodium employed). 2.0 g. of sodium metal is then added and activated by bubbling dry air into the mixture. 103.5 g. (4.4 mols) of sodium metal is added in small portions and 54.3 liters (2.2 mols) of acetylene gas at 28° C. and 747 mm. mercury pressure is bubbled into the suspension of the sodium amide and 500 g. (2.2 mols) of pentamethylene dibromide is added at a fast dropwise rate sufficient to retain gentle refluxing ammonia. Upon completion of addition of the dibromide, agitation of the mixture is increased to wash down the splattered material on the sides of the reaction flask. The reaction is then stopped and the openings of the reaction vessel covered with polyvinyl chloride film, the reaction mixture being allowed to stand overnight. The reaction mixture is then agitated while water is added slowly with caution. The pressure is vented by loosening the plastic sheets covering the reaction vessel opening. Upon addition of about 400 ml. of water, the reaction vessel walls are washed by increasing the agitation. The resultant gummy solid is found to be soluble in organic solvents, i.e, pentane and ether. Isolation of the desired acetylenic cyclic hydrocarbon is accomplished by recrystallization from ether, yielding not only the cyclic hydrocarbon but also the respective tri- and tetraacetylenically unsaturated compounds as by-products. The crude product is further vacuum distilled and recrystallized from ether, yielding the desired product melting at 99° to 100° C. This $C_{14}H_{20}$, having a molecular weight of 188.3, is indicated by the following elemental analytical data:

| Element | Actual Percent by Weight | Calculated Percent by Weight |
|---|---|---|
| C | 89.6 | 89.3 |
| H | 10.6 | 10.7 |

Infrared spectra indicate the presence of internal acetylenic linkage and the absence of terminal acetylenic linkage; in addition, the compound is insoluble in water and soluble in acetone, cyclohexanone and xylene.

Example 2

The procedure given in Example 1 is carried out separating the 1,8,15-hexadecatriyne distilling at 100° to 115° C. at .7 to 1.0 mm. mercury pressure. This triacetylenic hydrocarbon has a refractive index at 25° C. of $n_D^{25}$ 1.4774, this $C_{16}H_{22}$ being indicated by the following elemental analytical data:

| Element | Actual Percent by Weight | Calculated Percent by Weight |
|---|---|---|
| H | 10.3 | 103. |

Infrared spectra also indicates the desired product.

Example 3

PREPARATION OF 1,7,13-TETRADECATRIYNE AND 1,7,13,19-EICOSATETRAYNE

Into a flask equipped with cooling means, stirrer, and condenser, about 2½ to 3 liters of anhydrous liquid ammonia, 1.8 g. of ferric nitrate hydrate is added to the mixture with stirring, followed by the addition 2 g. of sodium metal, and then dry air is bubbled into the mixture for about 30 seconds to activate the catalyst. Then 137 g. of sodium is added at a rate which causes a brisk evolution of hydrogen. When no further hydrogen is evolved the stirrer is speeded up to wash the flask walls free of spattered sodium. Acetylene is then added to the mixture until the milky suspension begins to clear, typically about ½ to 2 hours. 648 g. (3.0 mols) of tetramethylene dibromide is then added at a rate to retain a gentle reflux of liquid ammonia. Upon reaction completion, the ammonia is allowed to evaporate. About 200 to 300 mls. of water is then added with caution and the two layers formed, i.e., the organic layer and aqueous layer, are extracted several times with 100 ml. portions of ether. The combined ether extracts are washed with dilute hydrogen chloride and dilute sodium carbonate aqueous solutions and dried over calcium sulfate. Ether is then removed through distillation. The resultant product is distilled with 1,7,13-tetradecatriyne, $C_{14}H_{18}$, boiling at 111° to 112° C. at 1.0 mm. mercury pressure and an additional product, 1,7,13,19-eicosatetrayne, $C_{20}H_{26}$, boiling at 165° to 170° C. at 0.3 mm. mercury pressure. The above triyne is indicated by the following elemental analytical data:

| Element | Actual Percent by Weight | Calculated Percent by Weight |
| --- | --- | --- |
| C | 89.2 | 90.2 |
| H | 9.6 | 9.8 |
| Molecular Weight | 188 | 186 |

The above tetrayne is also indicated by the following elemental analytical data:

| Element | Actual Percent by Weight | Calculated Percent by Weight |
| --- | --- | --- |
| C | 89.3 | 90.2 |
| H | 9.8 | 9.8 |
| Molecular Weight | 276 | 266 |

Other higher polyynes are also formed as by-products of the above reaction. The desired products are also indicated by infrared spectra.

*Example 4*

To evaluate insecticidal activity of 1,7,13,19-eicosatetrayne, i.e., on the products of Example 1, a test is carried out whereby adult two-spotted spider mites, *Tetranychus bimaculatus*, maintained on Tendergreen beans under controlled conditions are transferred from a stock culture by leaf cuttings to uninfested leaves of bean plants in 2½ inch pots the day prior to testing. Formulation of 1,7,13,19-eicosatetrayne (2000 p.p.m. 1,7,13,19-eicosatetrayne, 5% acetone, 0.01% Triton X-155, balance water) is sprayed onto the infested test plants. Counts are made after two days demonstrating 100% insect mortality.

*Example 5*

To further demonstrate insecticidal activity of 1,7,13,19-eicosatetrayne, fourth instar larvae of the Mexican bean beetle, *Epilachna varivestis*, less than one day old within the instar, are employed. Paired seed leaves, excised from Tendergreen bean plants, are dipped in a formulation of the test chemical (2000 p.p.m. 1,7,13,19-eicosatetrayne, 5% acetone, 0.01% Triton X-155, balance water) until they are thoroughly wetted. The chemical deposit on the leaf is then dried and the paired leaves are separated. Each is placed in a 9 cm. Petri dish with a filter paper liner, and ten randomly selected larvae are introduced before the dish is closed. After three days' exposure, 100% mortality is observed.

*Example 6*

In order to evaluate insecticidal activity of the compounds of this invention, male German cockroaches, *Blattella germanica*, 8 to 9 weeks old, are anaesthetized with carbon dioxide to facilitate handling and then dipped in a test formulation (2000 p.p.m. test chemical, 5% acetone, 0.01% Triton X-155, balance water) for 10 seconds, removed and freed of excess liquid, and caged. Two lots of 10 insects each are exposed to this formulation and mortality observations are recorded after three days. Using this procedure, the following mortality ratings are observed.

TABLE I

| Compound: | Percent roach mortality at 2000 p.p.m. |
| --- | --- |
| 1,8,15-hexadecatriyne (product of Example 2) | 50 |
| 1,7,13,19-eicosatetrayne (product of Example 3) | 100 |
| 1,7,13-tetradecatriyne (product of Example 3) | 100 |

*Example 7*

Insecticidal utility of 1,7,13,19-eicosatetrayne, i.e., one of the products of Example 3, is shown in the following test. The bean aphid, *Aphis fabae*, is cultured on nasturtium plants. No attempt is made to select insects of a given age in this test. Test pots are prepared by reducing the number of nasturtium plants in 2½ inch culture pots until those remaining are infested with approximately 100 aphids. The infested test plants are treated with a formulation of the test chemical (2000 p.p.m. 1,7,13,19-eicosatetrayne, 5% acetone, 0.01% Triton X-155, balance water). Based on counts made 24 hours after exposure greater than 90% mortality is observed.

*Example 8*

In order to evaluate systemic fungicidal activity, tomato plants, variety Bonny Best, growing in 4-inch pots are treated by pouring a test formulation (2000 p.p.m. product of Example 1, 5% acetone, 0.01% Triton X-155, balance water) on the soil in the pots at a rate equivalent to 128 lbs./acre (102 mg./pot). The tomato plants are 3 to 4 inches tall and the trifoliant leaves are just starting to unfold at time of treatment. The tomato plants are exposed to the early blight fungus so that at the time of treatment, innfection has occurred After 10 to 14 days observation indicates greater than 45% disease control.

*Example 9*

Spore germination tests on glass slides are conducted via the test tube dilution method adopted from the procedure recommended by the American Phytopathological Society's committee on standardization of fungicidal tests. In this procedure, the product of Example 2 in aqueous formulations at concentrations of 1000, 100, 10 and 1.0 p.p.m. is tested for its ability to inhibit germination of spores from 7 to 10 day old cultures of *Alternaria oleracea* and *Monilinia fructicola*. These concentrations refer to initial concentrations before diluting four volumes with one volume of spore stimulant and spore suspension. germination records taken after 20 hours of incubation at 22° C. by counting 100 spores. Based on a rating system whereby the listed concentration affords disease control, the following compounds were rated according to their actvity in this test:

TABLE II

| Compound | Fungi (p.p.m.) | |
| --- | --- | --- |
| | A. oleracea | M. fructicola |
| 1,8-cyclotetradecatriyne (Product of Example 1) | 1,000 | 100–1,000 |
| 1,8,15-hexadecatriyne (Product of Example 2) | 10–1,000 | 100–1,000 |
| 1,7,13-tetradecatriyne (Product of Example 3) | 100–1,000 | 100–1,000 |
| 1,7,13,19-eicosatetrayne (Product of Example 3) | 100–1,000 | 1,000 |

Example 10

A tomato foliage disease test is conducted measuring the ability of the product of Example 2 to protect tomato foliage against infection by the early blight fungus *Alternaria solani*. Tomato plants 5 to 7 inches high of the variety Bonny Best are employed. The plants are sprayed with 100 ml. of test formulation at 2000 p.p.m. (2000 p.p.m. product of Example 2, 5% acetone, 0.01% Triton X–155, balance water) at 40 lbs. air pressure while being rotated on a turntable in a spray chamber. After the spray deposit is dry, the treated plants and comparable untreated controls are sprayed with a spore suspension containing approximately 20,000 conidia of *A. solani* per ml. The plants are held in a 100% humid atmosphere for 24 hours at 70° F. to permit spore germination and infection. After 2 to 4 days, lesion counts are made on the three uppermost fully expanded leaves. Data based on the number of lesions obtained on the control plants shows better than 75% disease control.

Example 11

To evaluate bactericidal activity, the test chemical is mixed with distilled water containing 5% acetone and 0.01% Triton X–155, at a concentration of 250 p.p.m. 5 ml. of the test formulation are put in each of four test tubes. To each test tube is added one of the organisms: *Erwinia amylovora*, *Xanthomonas phaseoli*, *Staphylococcus aureus* and *Escherichia coli* in the form of a bacterial suspension in a saline solution from potato-dextrose agar plates. The tubes are then incubated for 4 hours at 30° C. Transfers are then made to sterile broth with a standard 4 mm. loop and the thus-inoculated broth is incubated for 48 hours at 37° C. Using this procedure the products of Example 3 afford the noted bacterial control:

TABLE III

| Compound Tested | E. amylovora | X. phaseoli | S. aureus | E. coli |
| --- | --- | --- | --- | --- |
| 1,7,13-tetradecatriyne | 90 | 70 | 40 | 10 |
| 1,7,13,19-eicosatetrayne | 40 | 0 | 40 | 0 |

Example 12

Seeds of green foxtail and lamb's quarters are treated in Petri dishes with aqueous suspensions of the test chemical at 1000 and 100 p.p.m. (1000 or 100 p.p.m. product of Example 3, 5% acetone, 0.01% Triton X–155, balance water). Lots of 25 seeds of each type are scattered in separate dishes containing filter paper discs moistened with 5 ml. of the test formulation at each concentration. After 7 to 10 days under controlled conditions, the test compound is given a rating which corresponds to the concentration that inhibits germination of half of the spores ($ED_{50}$) in the test or greater. Using this test, the following results are observed:

TABLE IV

| Compound Tested | Concentration inhibiting germination of half of the seeds (p.p.m.) | |
| --- | --- | --- |
| | Lamb's-Quarters | Green Foxtail |
| 1,7,13-tetradecatriyne | 100–1,000 | 100–1,000 |
| 1,7,13,19-eicosatetrayne | 1,000 | 100–1,000 |

Example 13

To evaluate the effect of the compounds of this invention upon the germination of seeds in soil, a mixture of seed of six crop plants is broadcast in 8 x 8 x 2 inch metal cake pans filled to within ½ inch of the top with composted greenhouse soil. The seed is uniformly covered with about ¼ inch of soil and watered. After 24 hours, 80 ml. of an aqueous test formulation (320 mg. test chemical, 5% acetone, 0.01% Triton X–155, balance water) uniformly over the surface of the pan. This is equivalent to 64 lbs./acre. The seed mixture contains representatives of three broadleafs: turnip, flax, and alfalfa, and three grasses: wheat, millet, and rye grass. Two weeks after treatment records are taken on seedling stand as compared to the controls. Using this procedure the following results are indicated:

TABLE V

| Compound | Percent Stand | |
| --- | --- | --- |
| | Broadleaf Plants | Grass Plants |
| 1,7,13,19-eicosatetrayne (Product of Example 3) | 50 | 20 |
| 1,8,15-hexadecatriyne (Product of Example 2) | 90 | 40 |
| 1,7,13-tetradecatriyne | 10 | 5 |

Example 14

To test herbicidal activity of the product of Example 1, tomato plants, variety Bonny Best, 5 to 7 inches tall; corn, variety Cornell M–1 (field corn), 4 to 6 inches tall; bean, variety Tendergreen, just as the trifoliate leaves are beginning to unfold; and oats, variety Clinton, 3 to 5 inches tall, are sprayed with an aqueous test formulation (6400 p.p.m. test chemical, 5% acetone, 0.01% Triton X–155, balance water). The plants are sprayed with 100 ml. at 40 lbs. air pressure while being rotated on a turntable in a spray hood. Records are taken 14 days after treatment and phytotoxicity is rated on a scale from 0 for no injury to 11 for plant kill. Using this procedure the product of Example 1 receives ratings of 2, 3, 11 and 1 for the tomato, bean, corn and oat plants, respectively, thus demonstrating selective herbicidal activity.

Example 15

In order to make an invitro evaluation of the product of Example 2 as a contact poison, non-plant parasite nematodes (*Panagrellus redivivus*) are exposed to the test chemical in small watch glasses, (27 mm. diameter x 8 mm. deep), within a 9 cm. Petri dish. An aqueous test formulation (1000 p.p.m. test chemical, 5% acetone, 0.01% Triton X–155, balance water) is used. Results are recorded 24 hours after treatment and from these it is shown that the product of Example 2, i.e., 1,8,15-hexadecatriyne and one of the products of Example 3, i.e., 1,7,13-tetradecatriyne, cause 100% nematode control at the above concentration.

Example 16

In order to demonstrate the effectiveness of a stabilizer of the present invention, a procedure is carried out by which alpha-chloro-p-xylene is stabilized with 1,8,15-hexadecatriyne. In this test 25 ml. of alpha-chloro-p-xylene is placed in each of six 4 ounce clear glass containers. 1,8,15-hexadecatriyne is added to the first five containers in concentrations of 0.0125 g., .025 g., .125 g., .250 g., and .500 g., respectively. A metal contaminant comprising 50% iron powder and 50% iron oxide is then added in concentrations of from 0.01 g. to 0.5 g. per container. A series of six solutions is made up in this manner, the last solution being employed as a standardized check. Each of these solutions is allowed to stand at room temperature for 9 days in the presence of ordinary room light whereupon each of the solutions is rated on a scale from 0 for colorless to 10 denoting complete decomposition and high discoloring. Employing this procedure, the standard check solutions were completely black receiving a rating of 10 at the end of the period employed, whereas the stabilized solutions were colorless, receiving a rating of 0. Thus demonstrating that 1,8,15-hexadecatriyne is singularly effective in the stabilization of alpha-chloro-p-xylene for a period of greater than 9 days under the conditions employed.

Example 17

To further demonstrate the effectiveness of a combination of stabilizers of the present invention, a procedure is carried out by which alpha-chloro-p-xylene is stabilized with 1,8,15-hexadecatriyne and ethylene glycol. In this test 25 ml. of the alpha-chloro-p-xylene is placed in each of four 4-ounce clear glass containers. A combination of 0.0125 g. of 1,8,15-hexadecatriyne and 0.0125 g. of ethylene glycol is added to the first container. To the second a combination of 0.0625 g. of the triyne and 0.0625 g. of ethylene glycol is added and a combination of 0.125 g. of the triyne and 0.125 g. of ethylene glycol is added to the third, respectively. A metal contaminant comprising 50% iron powder and 50% iron oxide is then added on concentrations from about 0.01 g. to 0.5 g. per container. A series of four solutions is made up in this manner, the latter solution being employed as the standardized check. Each solution is allowed to stand at room temperature for 16 days in the presence of ordinary room light, whereupon each of these solutions is rated on a scale from 0 for colorless to 10 denoting complete decomposition and high discoloring. Employing this procedure the standard check solutions were completely black at the end of the period employed whereas the stabilized solutions were colorless, receiving a rating of 0. Thus demonstrating that the combination of 1,8,15-hexadecatriyne and ethylene glycol is synergistically effective, stabilizing alpha-chloro-p-xylene for a period of better than 15 days under the conditions employed.

Example 18

A further demonstration of the effectiveness of the stabilizers of the present invention is carried out by stabilizing alpha-chloro-p-xylene with a combination of 1,8,15 - hexadecatriyne and bis - (2-propynyl)-2,3,5,6-tetrachloroterephthalate.

Essentially the same stabilization procedure given in Example 16 is employed in this evaluation with the exception that a concentration of .0625 g. of the triyne in combination with .0625 g. of the alpha, omega diacetylenic ester is employed. This test indicates that at this concentration, the combination of the alpha, omega polyacetylenic hydrocarbon and the alpha, omega diacetylenic esters are effective as stabilizers for alpha-chloro-p-xylene for a period of at least three days.

Example 19

Stabilizing effectiveness of the product of Example 1 is demonstrated by stabilizing benzyl chloride employing essentially the same test procedure given in Example 16. In this test the cyclic compound is completely ineffective in stabilizing alpha-chloro-p-xylene, but all the solutions of benzyl chloride are colorless after a period of greater than 15 days.

Example 20

PREPARATION AND ALKYLATION OF SODIUM ACETYLIDES

Sodium (7 mols) is reacted with 4 liters of anhydrous ammonia at $-33°$ in the presence of iron containing catalyst prepared by the method set forth in Organic Reactions, vol. 5, pp. 48–49. Dry acetylene is then metered into the suspension of sodium amide in ammonia until the desirable ratio of mono to disodium acetylide is reached, i.e., 1:1 or 2:1. The dihalide is added dropwise and the reaction mixture stirred under reflux for four hours. The Dry Ice-acetone condenser is removed, the opening covered with a cellophane film, and the ammonia is permitted to evaporate over a 16-hour period. The residue is diluted with water and, if the organic portion is not sufficiently liquid, it is dissolved in ether. The organic layer is washed, in succession, with dilute hydrochloric acid, sodium carbonate, water and dried over magnesium sulfate. The products are separated by fractional distillation. In reactions where $n$ is 5, the distillation is temporarily interrupted after the diyne and triyne (II, $x=1$ and 2) are collected. On cooling, the cyclic diyne III ($x=1$) crystallizes and is removed by filtration. Fractional distillations at 0.1 mm. are continued until a pot temperature of 350° is reached. The pot residue is frequently only tan-colored and of vaseline-like consistency. Fractions of narrow boiling range are redistilled or crystallized from appropriate mixtures of ether-petroleum ether. The products are characterized by boiling and melting points, index of refraction and infrared spectra.

TABLE I $$Na-C\equiv C-Na$$
$$Na-C\equiv C-H + Br(CH_2)_nBr \longrightarrow H-C\equiv C-[-(CH_2)_nC\equiv C-]_x-H(V) +$$ 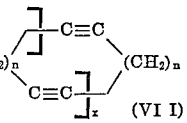 (VI I)

| Polyyne Type | n | x | Mol. Weight | | B.P. | | M.P., °C. | Characteristic I.R. Bands, μ (intensity) | | | |
|---|---|---|---|---|---|---|---|---|---|---|---|
| | | | | | | | | H—C≡ | C≡C | | —CH₂— (Rocking) |
| | | | Calcd. | Found | Calcd. | Found | °C. | mm. Hg | | | Terminal | Internal | |
| V | 4 | 2 | 90.3 | 89.2 | 9.7 | 9.6 | 186 | 188 | 111 | 1.0 | | 3.02vs | 4.70m | 4.47vw | 13.62w |
| V | 4 | 3 | 90.2 | 89.3 | 9.8 | 9.8 | 266 | 276 | 167 | 0.3 | | 3.02vs | 4.70m | 4.47vw | 13.55w |
| V | 4 | 7 | 90.1 | 88.5 | 9.9 | 10.2 | 586 | 587 | | | 36 | 3.05w | 4.75w | | 13.55vw |
| V | 4 | 8 | 90.1 | 86.9 | 9.9 | 10.2 | 666 | 666 | | | 55 | 3.05w | 4.75w | | 13.55vw |
| Vᵃ | 5 | 2 | 89.5 | 88.3 | 10.3 | 10.3 | 214 | 203 | 113 | 0.8 | | 3.07vs | 4.75m | | 13.80m |
| V | 5 | 3 | 89.6 | 89.1 | 10.4 | 10.6 | 308 | 279 | 170 | 0.1 | 33 | 3.02s | 4.72m | | |
| V | 6 | 2 | 89.3 | 89.9 | 10.7 | 10.3 | 242 | 237 | 131 | 0.2 | 24 | 3.04vs | 4.72m | | 13.82m |
| H—C≡C(CH₂)₄O—(CH₂)₄C≡C—Hᵇ | | | 81.0 | 79.4 | 10.1 | 9.9 | 178 | 164 | 130 | 30 | | 3.05vs | 4.74m | | |
| VIII | 5 | 1 | 89.3 | 89.6 | 10.7 | 10.6 | 188 | 182 | | | 100 | | | 4.50w | 13.64s |
| VIIIᶜ | 4 | 3 | 90.0 | 89.5 | 10.0 | 9.8 | 320 | 276 | 215 | 0.2 | 71 | | | 4.50vw | 13.60w |
| (CH₂)₄C≡C(CH₂)₄—Oᵇ<br>\|　　　　　　　　\|<br>O—(CH₂)₄C≡C (CH₂)₄ | | | 79.0 | 79.1 | 10.5 | 10.6 | 304 | 279 | 175 | 0.1 | 75 | | | 4.50vw | | v=very; s=strong; m=medium; w=weak.
ᵃ From the alkylation of HC≡C(CH₂)₅C≡CH with Br(CH₂)₅Br.
ᵇ From the ethynylation of I(CH₂)₄O(CH₂)₄I.
ᶜ From the alkylation of HC≡C(CH₂)₄C≡CH with Br(CH₂)₄Br.

NOTE.—An equivalent excess of about 25% to 50% Na over Br is used.

Example 21

PREPARATION OF HC≡C(CH₂)₄O(CH₂)₄C≡CH AND

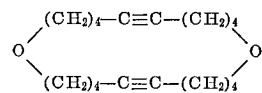

Sodium amides is prepared from 69 g. (3.0 mols) of sodium and 3 liters of anhydrous ammonia, at its boiling point (−32°), and in the presence of iron containing catalyst. A 2:1 mixture of Na—C≡C—H to NaC≡CNa is then prepared by the introduction of 2.25 moles of acetylene (measured with the aid of a wet test gas meter). The addition of 382 g. (1.0 mol) of I(CH$_2$)$_4$O(CH$_2$)$_4$I is over a period of 4 hours. The stirred mixture is kept near −32° while ammonia is permitted to evaporate through a Cellophane-capped outlet. The residue is diluted with water and the organic layer washed with dilute HCl, and dried. Repeated fractional distillation yields:

(a)     HC≡C(CH$_2$)$_4$O(CH$_2$)$_4$C≡CH 19.5 g., colorless liquid, B.P. 130° at 30 mm., $n_D^{20}$ 1.4577. *Analysis.*—Calcd. for C$_{12}$H$_{16}$O: C, 81.0; H, 10.1; M. Wt. 178. Found: C, 79.4; H, 9.9; M. Wt. 165. The infrared spectrum contains the characteristic absorption bands of —C≡C—H near 3.05 and 4.74μ.

(b) 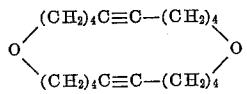

5 g., B.P. 180 at 0.08 mm., M.P. 74–5° (colorless crystals). *Analysis.*—Calcd. for C$_{20}$H$_{32}$O$_2$: C, 79.0; H, 10.5. Found: C, 79.1; H, 10.6. The infrared spectrum shows it to be free of absorption bands characteristic of a terminal triple bond. The internal triple bond was evident from the absorption band near 4.50μ.

The 5-hexynyl ether exhibits activity as a contact poison against roaches, as a systemic rust fungicide and as a bactericide.

*Example 22*

PREPARATION OF H—C≡C—(CH$_2$)$_6$C≡C(CH$_2$)$_6$C≡C—H

Sodium amide is prepared from 47 g. (2.05 mols) of sodium in 3 liters of liquid ammonia at −32°. A 1:1 mixture of Na—C≡C—H and Na—C≡C—Na is prepared by metering into the suspension 1.37 moles of acetylene. Alkylation is effected by the addition of 200 g. (0.82 mol) of Br(CH)$_6$Br. Stirring is maintained for 48 hours while ammonia is permitted to evaporate through a Cellophane-capped opening. The residue is diluted with water and the organic layer washed with dilute HCl and dried. Repeated distillation yields 27 g. of colorless liquid, B.P. 130–9° at 0.2 mm., $n_D^{25}$ 1.4772 to 1.4806, which, on standing at 0°, partly solidifies. Crystallization from pentane yields a colorless solid, M.P. 24–5°. *Analysis.*—Calcd. for C$_{18}$H$_{26}$: C, 89.3; H, 10.7; M. Wt. 242. Found: C, 89.9; H, 10.3; M. Wt. 237. Its infrared spectrum contains bands near 3.04 and 4.72μ, characteristic of terminal triple bonds.

*Example 23*

PREPARATION OF 

Sodium amide is prepared from 23 g. (1.0 mol) of sodium and 2 liters of liquid ammonia at −32°. To this suspension is added 211 g. (1.75 mol) of

 HC≡C(CH$_2$)$_5$C≡CH

The product is alkylated with 69 g. (0.3 mol) of Br(CH$_2$)$_5$Br. The suspension is stirred for 16 hours while ammonia is permitted to evaporate through a cellophane-capped opening. The residue is diluted with water and the organic layer washed with dilute HCl and dried. Distillation results in the recovery of 144 g. of the starting nonadiyne, and 26 g. of 1,8-cyclotetradecadiyne. Further distillation yields a fraction boiling from 160°–170° at 0.1 mm., which solidifies on cooling to room temperature. Crystallization of this fraction from ether gives 25 g. of the solid 1,8,15,22-tricosatetrayne, M.P. 32–3°. *Analysis.*—Calcd. for C$_{23}$H$_{32}$: C, 89.6; H, 10.4; M. Wt. 308. Found: C, 89.1; H, 10.6; M. Wt. 279. Its infrared spectrum contains bands near 3.02 and 4.72μ, characteristic of the terminal triple bond.

*Example 24*

PREPARATION OF 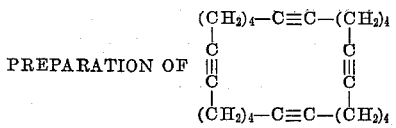

Sodium amide is prepared from 51 g. (2.2 mol) of sodium and 3 liters of liquid ammonia (−32°). To this suspension is added 116 g. (1.1 mols) of

 H—C≡C(CH$_2$)$_4$C≡CH and the product is alkylated with 216 g. (1.0 mol) of Br(CH$_2$)$_4$Br. The mixture is stirred for 16 hours while ammonia is permitted to evaporate through a Cellophane-capped opening. The residue is diluted with water and the organic layer washed with dilute HCl and dried. Distillation results in a recovery of 15 g. of the starting 1,7-octadiyne and 8.0 g. of 1,7-cyclododecandiyne, M.P. 38–9°. *Analysis.*—Calcd for C$_{12}$H$_{16}$: C, 89.9; H, 10.1; M. Wt. 160. Found: C, 89.5; H, 10.2; M. Wt. 152. Its infrared spectrum is free from absorption bands, characteristic of a terminal triple bond. Further distillation produces a yellow oil, b.p. 210–220° at 0.2 mm. Hg. which partly solidifies on standing. Crystallization from a mixture of ether and pentane yields 1,7,13,19-cyclotetracosatetrayne as a white solid, M.P. 70–71°. *Analysis.*—Calcd. for C$_{24}$H$_{32}$: C, 90.0; H, 10.0. Found: C, 89.5; H, 9.8. Its infrared spectrum is free from absorption bands characteristic of a terminal triple bond.

*Example 25*

PREPARATION OF 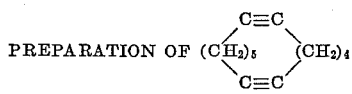

Sodium amide is prepared from 46 g. (2.0 mols) of sodium and 2 liters of liquid ammonia (−32°). To this mixture is added 120 g. (1.0 mol) of

 H—C≡C(CH$_2$)$_5$C≡CH and the product is alkylated with 173 g. (0.8 mol) of Br(CH$_2$)$_4$Br. The suspension is stirred and the ammonia permitted to evaporate through a Cellophane-capped opening for 16 hours. The residue is diluted with water and the organic layer washed with dilute HCl and dried. Distillation yields 42 g. of 1,7-cyclotridecadiyne, B.P. 83–4° at 0.08 mm., M.P. 7°, $n_D^{25}$ 1.5060. *Analysis.*—Calcd. for C$_{13}$H$_{18}$: C, 89.7; H, 10.3; M. Wt. 174. Found: C, 89.0; H, 10.3; Mt. Wt 171 The infrared spectrum is free of bands characteristic of a terminal triple bond.

Further to illustrate the preparation of other compounds of the invention, the following examples are provided wherein the quantities and steps designated (a) and (b) refer to the preparation of a mixture of mono and disodium acetylide, and step (c) refers to the alkylation, all accomplished via the procedure of the foregoing five examples.

*Example 26*

PREPARATION OF H—C≡C(CH$_2$)$_3$C≡C(CH$_2$)$_3$C≡CH (a) NH$_3$, 3 liters; NaNH$_2$, 2 M from 46 g. (2 M) of Na
(b) H—C≡C—H, 1.5 moles yielding a 2:1 ratio of NaC≡CH to Na—C≡C—Na
(c) Br(CH$_2$)$_3$Br, 161 g. (0.8 mole)

*Example 27*

PREPARATION OF 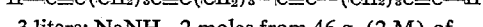

(a) NH$_3$, 3 liters; NaNH$_2$, 2 moles from 46 g. (2 M) of Na
(b) H—C≡C(CH$_2$)$_3$C≡C—H, 368 g. (4 moles)
(c) Br(CH$_2$)$_3$Br, 161 g. (0.8 mole)

Example 28

PREPARATION OF
H—C≡C(CH₂)₆C≡C(CH₂)₆—C≡C(CH₂)₆C≡C—H (a) NH₃, 3 liters; NaNH₂, 2 moles from 46 g. (2 M) of Na
(b) H—C≡C(CH₂)₆C≡CH, 536 g. (4 moles)
(c) Br(CH₂)₆Br, 195 g. (0.8 mole)

Example 29

PREPARATION OF
H—C≡C(CH₂)₇C≡C(CH₂)₇—C≡C(CH₂)₇C≡C—H (a) NH₃, 3 liters; NaNH₂, 2 moles from 46 g (2 M) of Na
(b) H—C≡C(CH₂)₇C≡C—H, 592 g. (4 moles)
(c) Br(CH₂)₇Br, 206 g. (0.8 mole)

Example 30

PREPARATION OF
$$(C\overset{C\equiv C}{\underset{C\equiv C}{H_2)_5\quad (CH_2)_5}})$$

(a) NH₃, 4 liters; NaNH₂, 1 mole from 23 g. (1 M) of Na
(b) H—C≡C(CH₂)₅C≡C—H, 60 g. (0.5 mole)
(c) Br(CH₂)₆Br, 122 g. (0.5 mole)

Example 31

PREPARATION OF
$$(CH_2)_6\overset{C\equiv C}{\underset{C\equiv C}{\quad}}(CH_2)_6$$

(a) NH₃, 4 liters; NaNH₂, 1 mole from 23 g. (1 M) of Na
(b) H—C≡C(CH₂)₆C≡C—H, 67 g. (0.5 mole)
(c) Br(CH₂)₆Br, 122 g. (0.5 mole)

Example 32

PREPARATION OF (CH₂)₄—C≡C—(CH₂)₄
                  |              |
                  C≡C(CH₂)₄—C≡C (a) NH₃, 4 liters; NaNH₂, 1 mole from 23 g. (1 M) of Na
(b) H—C≡C(CH₂)₄C≡C(CH₂)₄C≡C—H, 93 g. (0.5 mole)
(c) Br(CH₂)₄Br, 108 g. (0.5 mole)

Example 33

PREPARATION OF (CH₂)₅—C≡C—(CH₂)₅
                  |              |
                  C≡C—(CH₂)₅—C≡C (a) NH₃, 4 liters; NaNH₂, 1 mole from 23 g. (1 M) of Na
(b) H—C≡(CH₂)₅C≡C(CH₂)₅C≡C—H, 107 g. (0.5 mole)
(c) Br(CH₂)₅Br, 115 g. (0.5 mole)

Example 34

PREPARATION OF (CH₂)₆—C≡C—(CH₂)₆
                  |              |
                  C≡C—(CH₂)₆—C≡C (a) NH₃, 4 liters; NaNH₂, 1 mole from 23 g. (1 M) of Na
(b) H—C≡C(CH₂)₆C≡C(CH₂)₆C≡CH, 121 g. (0.5 mole)
(c) Br(CH₂)₆Br, 122 g. (0.5 mole)

Additionally to illustrate the preparation of mixtures of mono and disodium acetylide, the following examples are provided:

Example 35

$$4Na-C\equiv C-H + \xrightarrow{Heat} 2Na-C\equiv C-Na + 2H-C\equiv C-H$$

A suspension of 192 g. (4 moles) of monosodium acetylide (NaC≡CH) in 2 liters of kerosene (mixture of saturated hydrocarbons) is stirred and heated at 200° until 22.4 liters (S.T.P.) of acetylene is evolved. The suspension is cooled to 25° and the agitation stopped to permit the solids to settle. The kerosene is sucked off and the solids washed in succession with three 200 ml. portions of petroleum ether, and stored as slurry in petroleum ether.

Example 36

$$4Na + 3HC\equiv C-H \rightarrow 2Na-C\equiv C-H + NaC\equiv C-Na + 2H_2$$

A 5-liter three-necked flask is fitted with a reflux condenser, stirrer and gas inlet tube. Ninety-two g. (4 gram atoms) of a sodium dispersion (10–25 microns particle size, containing 0.25% of aluminum stearate and 0.5% of oleic acid) in 4 liters of xylene is heated to 105° C. Purified acetylene (passed through 90% H₂SO₄ and a column filled with activated alumina) is introduced under the surface of the suspension. A total of 78.4 liters (S.T.P., 3.5 moles) of acetylene is introduced. At this point 56.0 liters (S.T.P., 2.4 moles) of gas is evolved. It contains 1.9 moles of hydrogen, 0.4 mole of unreacted acetylene and 0.1 mole of ethylene. After cooling the reaction mixture to room temperature, the stirring is stopped and the solids permitted to settle. The xylene is sucked off and the residue is washed, in succession, with three 200 ml. portions of petroleum ether (B.P. 30–60° C.). Such a slurry is ready for further reaction with α,ω-dihalides.

To analyze the reaction product a small sample of the produced solids is treated with water and the liberated gas analyzed by means of vapor chromatography. Only acetylene is produced, indicating the absence of unreacted sodium in the solids.

Example 37

$$4KOH + 3CaC_2 \rightarrow K-C\equiv C-K + 2KC\equiv CH + 3CaO + H_2O$$

Four moles (dry basis) of KOH pellets and 3 moles (active ingredient basis) of commercial calcium carbide are slurried in 1.5 liters of butyl carbitol at 150° C. for three hours. Low boiling liquids, mainly water, are permitted to distill out of the reaction flask. The reaction product is cooled to 50° C. while vigorously stirred. Such a suspension can be used immediately in reactions with dihalides.

Example 38

$$4KOH + 3HC\equiv C-H \rightarrow K-C\equiv C-K + 2K-C\equiv C-H + 4H_2O$$

Four moles (dry basis) of KOH pellets in one liter of "diglyme" (dimethyl ether of diethylene glycol) are heated with stirring at 170° C. The heterogeneous mass is cooled to 60° C. while continuously and vigorously agitated. The introduction of acetylene produces an exothermic reaction. The flask is externally cooled so that the temperature is kept at 60° C.±10° C. The addition of acetylene is terminated after 3 moles are absorbed. The temperature is then lowered to 25° C., and such a suspension can be used in alkylation with dihalides.

Example 39

Lithium amide, prepared in liquid ammonia from 21.0 g. (3.0 moles) of lithium, is reacted with 2.0 moles of dry acetylene to produce a 1:1 molar ratio mixture of mono- and dilithium acetylide. Alkylation with 345 g. (1.5 moles) of pentamethylene dibromide gives 61 g. (51% yield) of 1,8-nonadiyne and a higher boiling liquid which via vacuum distillation yields 1,8-cycloteradecadiyne and a filtrate. Heating the filtrate yields 20.8 g. clear liquid B.P. 110°–80° C. @ 0.1 mm. Hg (1,8,15-hexadecatriyne).

Example 40

Potassium amide, prepared from 117.3 g. (3 moles) of potassium in liquid ammonia, is reacted with 2.0 moles of acetylene to yield a 1:1 molar ratio mixture of mono- and dipotassium acetylides. This mixture (10% excess) is alkylated with 311 g. (1.35 moles) of 1,5-dibromopentane. There is thus obtained a mixture of 36.1 g. of 1,8-nonadiyne, 6.6 g. of 1,8,15-hexadecatriyne and 7.8 g. of a yellow, amine-smelling liquid.

Example 41

Barium amide is prepared in liquid ammonia by adding 49.4 g. (0.36 mole) barium metal to the ammonia; dry acetylene (0.54 mole) is passed in to provide a 1:1 molar ratio of mono- and dibarium acetylides. Alkylation is carried out by adding 69 g. (0.30 mole) of 1,5-dibromopentane. There is thus obtained 3.3 g. of 1,8-nonadiyne ($n_D^{25}$ 1.4500), 3.3 g. of 1,8,15-hexadecatriyne ($n_D^{25}$ 1.4772) and 0.5 g. of 1,8-cyclotetradecadiyne (M.P. 95°–100° C.)

It is to be understood that although the invention has been described with specific reference to particular embodiments thereof, it is not to be so limited, since changes and alterations therein may be made which are within the full intended scope of this invention as defined by the appended claims.

What is claimed is:

1. A compound of the formula $$HC\equiv C-R_1[C\equiv C-R_2]_n C\equiv CH$$

wherein $R_1$ and $R_2$ are alkylene radicals containing from 2 to 15 carbon atoms and $n$ is a number from 1 to 15, inclusive.

2. A compound of the formula $$HC\equiv C-R_1-C\equiv C-R_2-C\equiv CH$$

wherein $R_1$ and $R_2$ are as defined in claim 1.

3. A compound of the formula $$HC\equiv C-R_1-C\equiv C-R_2-C\equiv C-R_1-C\equiv CH$$

wherein $R_1$ and $R_2$ are as defined in claim 1.

4. 1,9,17-octadecatriyne.
5. 1,8,15-hexadecatriyne.
6. 1,7,13-tetradecatriyne.
7. 1,6,11-dodecatriyne.
8. 1,6,11,16-heptadecatetrayne.
9. 1,7,13,19-eicosatetrayne.
10. 1,8,15,22-tricosatetrayne.
11. 1,9,17,25-hexacosatetrayne.
12. 1,10,19,28-nonacosatetrayne.
13. 1,7,13,19,25-hexacosapentayne.
14. A method for the preparation of linear and cyclic non-conjugated polyacetylenes which comprises reacting an alkylene dihalide with an excess of a mixture of mono- and di-(alkali metal) acetylides, the molar ratio of mono-(alkali metal) to di-(alkali metal) acetylide in said mixture being between 1:1 and 1:2.

15. The method of claim 14 wherein the reaction is carried out in liquid ammonia.

16. The method of claim 14 wherein the alkylene dihalide is a dibromide.

17. The method of claim 14 wherein the alkylene dihalide is a dichloride.

18. The method of claim 15 wherein the mixture of mono- and di-(alkali metal) acetylides is formed by metering a predetermined amount of acetylene into a suspension of an alkali metalamide in liquid ammonia.

19. The method of claim 18 wherein the alkali metal amide is sodamide.

References Cited by the Examiner

UNITED STATES PATENTS

| | | | |
|---|---|---|---|
| 1,810,174 | 6/31 | Herrmann et al. | 260—94.1 |
| 1,896,160 | 2/33 | Calcott et al. | 260—94.1 |
| 2,108,277 | 2/38 | Walker | 260—660 |
| 2,163,846 | 6/39 | Morton | 260—665 |
| 2,682,461 | 6/54 | Hutchison | 52—0.5 |
| 2,710,793 | 6/55 | Hutchison | 52—0.5 |
| 2,810,001 | 10/57 | Wiese | 260—666 |
| 2,870,182 | 1/59 | Leistner et al. | 260—429.7 |
| 2,872,468 | 2/59 | Leistner et al. | 260—429.7 |
| 2,875,256 | 2/59 | Hyman et al. | 260—666 |
| 2,958,709 | 11/60 | Wotiz | 260—651 |

OTHER REFERENCES

Adams et al.: "Organic Reactions," 1949, vol. 5, Wiley and Sons, page 31.

Gensler et al.: "Jour. Am. Chem. Soc.," Jan. 5, 1956, vol. 78, No. 1, pages 167–9.

Sondheimer et al.: "Jour. Am. Chem. Soc.," Dec. 5, 1957, vol. 79, No. 23, pages 6263–6267.

ALPHONSO D. SULLIVAN, *Primary Examiner.*

LEON D. ROSDOL, ABRAHAM RIMENS, *Examiners.*